US012562597B2

(12) United States Patent
Gu et al.

(10) Patent No.: US 12,562,597 B2
(45) Date of Patent: Feb. 24, 2026

(54) WIRELESS POWER TRANSMISSION DEVICE, AND ELECTRONIC DEVICE COMPRISING SAME

(71) Applicant: Samsung Electronics Co., Ltd., Suwon-si (KR)

(72) Inventors: Beomwoo Gu, Suwon-si (KR); Jaeseok Park, Suwon-si (KR); Jaehyun Park, Suwon-si (KR); Jaesun Shin, Suwon-si (KR); Sungku Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 18/680,176

(22) Filed: May 31, 2024

(65) Prior Publication Data

US 2024/0322602 A1     Sep. 26, 2024

Related U.S. Application Data

(63) Continuation of application No. PCT/KR2022/020711, filed on Dec. 19, 2022.

(30) Foreign Application Priority Data

Dec. 30, 2021 (KR) ........................ 10-2021-0192157
Feb. 28, 2022 (KR) ........................ 10-2022-0025943

(51) Int. Cl.
*H02J 50/00* (2016.01)
*H02J 50/12* (2016.01)

(52) U.S. Cl.
CPC .................................... *H02J 50/12* (2016.02)

(58) Field of Classification Search
None
See application file for complete search history.

(56) References Cited

U.S. PATENT DOCUMENTS 8,980,174 B2    3/2015  Haytman et al.
9,369,183 B2    6/2016  Nejatali et al.
(Continued)

FOREIGN PATENT DOCUMENTS

KR    10-2016-0010601 A    1/2016
KR        10-1671818 B1    11/2016
(Continued)

OTHER PUBLICATIONS

International Search Report dated Mar. 22, 2023, issued in International Application No. PCT/KR2022/020711.

*Primary Examiner* — Adi Amrany
(74) *Attorney, Agent, or Firm* — Jefferson IP Law, LLP

(57) ABSTRACT

An electronic device is provided. The electronic device includes a processor, a battery, and a wireless power transmission device, wherein the wireless power transmission device includes a power amplifier circuit including a switch circuit, a filter circuit, and a series resonant circuit, the power amplifier circuit being configured to convert direct current (DC) power received from the battery or a DC adapter into alternative current (AC) and to implement zero-voltage switching (ZVS), a power transmission circuit including a power transmission coil configured to transmit power received from the power amplifier circuit to outside, a matching circuit located between and connected to the power amplifier circuit and the power transmission circuit, the matching circuit being configured to match an impedance of the power amplifier circuit and the power transmission circuit, and a negative voltage detection circuit connected to the filter circuit of the power amplifier circuit and configured to detect a negative voltage generated in the filter circuit, and wherein the negative voltage detection circuit includes a voltage dividing circuit including a positive voltage power supply and a plurality of resistors, the voltage dividing circuit being configured to convert the negative (Continued)

300 voltage generated in the filter circuit of the power amplifier circuit into a positive voltage in a predetermined range, a voltage sensor configured to detect the positive voltage, and a low-pass filter located between and connected to the voltage dividing circuit and the voltage sensor.

17 Claims, 8 Drawing Sheets

(56) References Cited

U.S. PATENT DOCUMENTS

| | | | |
|---|---|---|---|
| 10,008,874 | B2 | 6/2018 | Green et al. |
| 10,790,784 | B2 | 9/2020 | Jurkov et al. |
| 2010/0201203 | A1 | 8/2010 | Schatz et al. |
| 2011/0285349 | A1 | 11/2011 | Widmer et al. |
| 2012/0153733 | A1 | 6/2012 | Schatz et al. |
| 2015/0249359 | A1* | 9/2015 | Gunderson ......... H02J 7/00712 |
| | | | 320/108 |
| 2017/0187355 | A1 | 6/2017 | Yang et al. |
| 2018/0205269 | A1 | 7/2018 | Han et al. |
| 2020/0154531 | A1 | 5/2020 | Kwack et al. |
| 2020/0244236 | A1 | 7/2020 | Hwang et al. |
| 2020/0271704 | A1 | 8/2020 | Hwang et al. |
| 2021/0083634 | A1 | 3/2021 | Aldhaher |
| 2021/0091765 | A1* | 3/2021 | Sasaki ................. H02M 1/0054 |
| 2023/0016332 | A1 | 1/2023 | Sekizawa et al. |

FOREIGN PATENT DOCUMENTS

| | | | |
|---|---|---|---|
| KR | 10-2016-0148035 | A | 12/2016 |
| KR | 10-2017-0118573 | A | 10/2017 |
| KR | 10-2018-0083723 | A | 7/2018 |
| KR | 10-2016957 | B1 | 9/2019 |
| KR | 10-2020-0053117 | A | 5/2020 |
| WO | 2021/125228 | A1 | 6/2021 |

* cited by examiner

WIRELESS POWER TRANSMISSION DEVICE, AND ELECTRONIC DEVICE COMPRISING SAME

CROSS-REFERENCE TO RELATED APPLICATION(S)

This application is a continuation application, claiming priority under § 365(c), of an International application No. PCT/KR2022/020711, filed on Dec. 19, 2022, which is based on and claims the benefit of a Korean patent application number 10-2021-0192157, filed on Dec. 30, 2021, in the Korean Intellectual Property Office, and of a Korean patent application number 10-2022-0025943, filed on Feb. 28, 2022, in the Korean Intellectual Property Office, the disclosure of each of which is incorporated by reference herein in its entirety.

BACKGROUND

1. Field

The disclosure relates to a wireless power transmission device. More particularly, the disclosure relates to a negative voltage detection circuit and an electronic device including the wireless power transmission device.

2. Description of Related Art

Wireless power transmission technology is used to wirelessly supply power to electronic devices. Wireless power transmission technology may include magnetic induction and magnetic resonance methods. The magnetic induction method has a disadvantage in that the transmitter and receiver must be closely adjacent to each other for power transmission. The magnetic resonance method has the advantage of being able to transmit power over a relatively long distance by concentrating energy at a specific resonant frequency.

The magnetic resonance type wireless power transmission device may include a class EF2 power amplifier (PA). The class EF2 power amplifier may reduce the switching loss caused by voltage and current overlap by using the zero-voltage switching (ZVS) method, which is a soft switching technology. The zero-voltage switching method may reduce the switching loss by minimizing the voltage and current overlap section by making the voltage across the switch to "0 [V]".

The above information is presented as background information only to assist with an understanding of the disclosure. No determination has been made, and no assertion is made, as to whether any of the above might be applicable as prior art with regard to the disclosure.

SUMMARY

Since the magnetic resonance type wireless power transmission device concentrates energy at a specific resonant frequency, when the resonant frequency changes due to external factors, the efficiency of the wireless power transmission system may rapidly decrease and the power amplifier of the wireless power transmission device may be damaged. For example, when a magnetic material approaches the wireless power transmission device, the resonant frequency may decrease and the input impedance (e.g., input impedance Zin in the direction facing second coil L2 from a second node N2 of the circuit illustrated in FIG.

2) may change capacitively. When the input impedance of the wireless power transmission device becomes capacitive, soft switching of the power amplifier may not be implemented and the power amplifier may be damaged.

A wireless power transmission device according to the prior art detects impedance changes by using a phase detector and a directional coupler, but has the disadvantage of increasing the cost and board size of the power amplifier. Accordingly, there is a need for a configuration that may be implemented at low cost and in a small size while detecting changes in the input impedance of the wireless power transmission device.

A wireless power transmission device according to various embodiments of the disclosure and an electronic device including the wireless power transmission device may detect a situation in which the input impedance is capacitive, and may include a negative voltage detection circuit that may be implemented at low cost and small size.

Aspects of the disclosure are to address at least the above-mentioned problems and/or disadvantages and to provide at least the advantages described below. Accordingly, an aspect of the disclosure is to provide a negative voltage detection circuit and an electronic device including the wireless power transmission device.

Additional aspects will be set forth in part in the description which follows and, in part, will be apparent from the description, or may be learned by practice of the presented embodiments.

In accordance with an aspect of the disclosure, an electronic device is provided. The electronic device includes a processor, a battery, and a wireless power transmission device, wherein the wireless power transmission device includes a power amplifier circuit including a switch circuit, a filter circuit, and a series resonant circuit, the power amplifier circuit being configured to convert direct current (DC) power received from the battery or a DC adapter into alternating current (AC) and to implement zero-voltage switching (ZVS), a power transmission circuit including a power transmission coil configured to transmit power received from the power amplifier circuit to outside, a matching circuit located between and connected to the power amplifier circuit and the power transmission circuit, the matching circuit being configured to match an impedance of the power amplifier circuit and the power transmission circuit, and a negative voltage detection circuit connected to the filter circuit of the power amplifier circuit and configured to detect a negative voltage generated in the filter circuit, and wherein the negative voltage detection circuit includes a voltage dividing circuit including a positive voltage power supply and a plurality of resistors, the voltage dividing circuit being configured to convert the negative voltage generated in the filter circuit of the power amplifier circuit into a positive voltage in a predetermined range, a voltage sensor configured to detect the positive voltage, and a low-pass filter located between and connected to the voltage dividing circuit and the voltage sensor.

In accordance with another aspect of the disclosure, a wireless power transmission device is provided. The wireless power transmission device includes a power amplifier circuit including a switch circuit, a filter circuit, and a series resonant circuit, the power amplifier circuit being configured to convert direct current (DC) power received from a battery or a DC adapter into alternating current (AC) and to implement zero-voltage switching (ZVS), a power transmission circuit including a power transmission coil configured to transmit power received from the power amplifier circuit to outside, a matching circuit located between and connected to the power amplifier circuit and the power transmission circuit, the matching circuit being configured to match an impedance of the power amplifier circuit and the power transmission circuit, and a negative voltage detection circuit connected to the filter circuit of the power amplifier circuit and configured to detect a negative voltage generated in the filter circuit, wherein the negative voltage detection circuit includes a voltage dividing circuit including a positive voltage power supply and a plurality of resistors, the voltage dividing circuit being configured to convert the negative voltage generated in the filter circuit of the power amplifier circuit into a positive voltage in a predetermined range, a voltage sensor configured to detect the positive voltage, and a low-pass filter located between and connected to the voltage dividing circuit and the voltage sensor.

In accordance with another aspect of the disclosure, an electronic device is provided. The electronic device includes a processor, a battery, and a wireless power transmission device, wherein the wireless power transmission device includes a power amplifier circuit including a switch circuit, a filter circuit, and a series resonant circuit, the power amplifier circuit being configured to convert direct current (DC) power received from the battery or a DC adapter into alternating current (AC) and to implement zero-voltage switching (ZVS), a power transmission circuit including a power transmission coil configured to transmit power received from the power amplifier circuit to outside, a matching circuit located between and connected to the power amplifier circuit and the power transmission circuit, the matching circuit being configured to match an imped- ance of the power amplifier circuit and the power transmis- sion circuit, and a negative voltage detection circuit con- nected to the filter circuit of the power amplifier circuit and configured to detect a negative voltage generated in the filter circuit, wherein the negative voltage detection circuit includes a precision rectification circuit configured to con- vert AC to DC, an inverting amplifier circuit configured to convert the negative voltage of the filter circuit into a positive voltage, and a voltage sensor configured to detect the positive voltage.

In accordance with another aspect of the disclosure, a wireless power transmission device is provided. The wire- less power transmission device includes a power amplifier circuit including a switch circuit, a filter circuit, and a series resonant circuit, the power amplifier circuit being configured to convert direct current (DC) power received from a battery or a DC adapter into alternating current (AC) and to imple- ment zero-voltage switching (ZVS), a power transmission circuit including a power transmission coil configured to transmit power received from the power amplifier circuit to outside, a matching circuit located between and connected to the power amplifier circuit and the power transmission circuit, the matching circuit being configured to match an impedance of the power amplifier circuit and the power transmission circuit, and a negative voltage detection circuit connected to the filter circuit of the power amplifier circuit and configured to detect a negative voltage generated in the filter circuit, wherein the negative voltage detection circuit includes a precision rectification circuit configured to con- vert AC to DC, an inverting amplifier circuit configured to convert the negative voltage of the filter circuit into a positive voltage, and a voltage sensor configured to detect the positive voltage.

A wireless power transmission device according to various embodiments of the disclosure and an electronic device including the wireless power transmission device may detect a situation in which zero-voltage switching is not implemented in the power amplifier circuit of the wireless power transmission device by detecting a case in which the input impedance of the wireless power transmission device becomes capacitive, including a negative voltage detection circuit capable of detecting the negative voltage of the filter circuit.

Since the wireless power transmission device according to various embodiments of the disclosure uses the method of connecting the negative voltage detection circuit to the filter circuit, it may be implemented in a small size and may be easily mounted on a low-cost circuit.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accom- panying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a micropro-cessor unit (MPU), a system on chip (SoC), an integrated circuit (IC), or the like.

Figure 1:
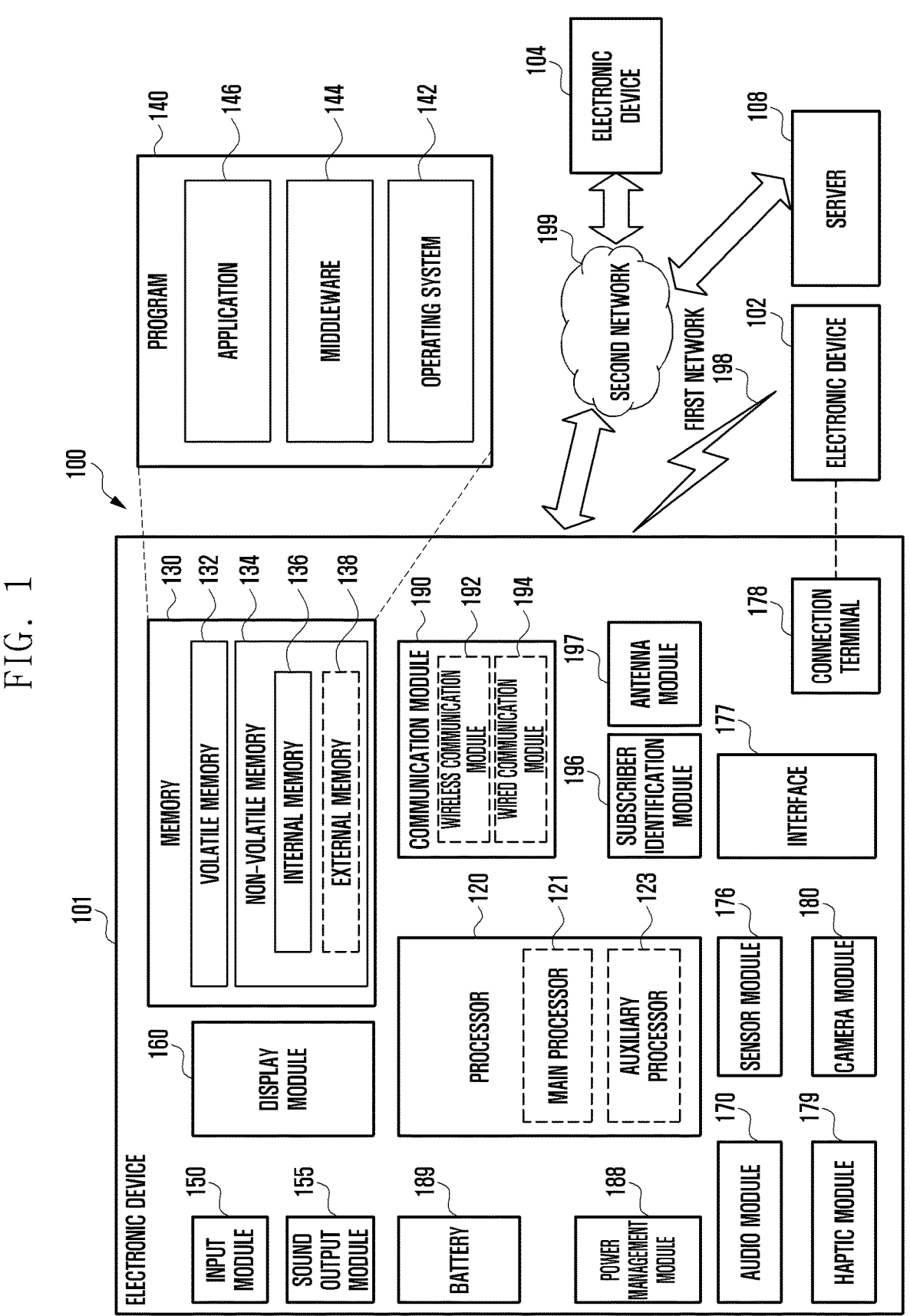
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identifica-tion module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be imple-mented as a single component (e.g., the display module 160).

The processor 120 may execute, for example, software (e.g., a program 140) to control at least one other component (e.g., a hardware or software component) of the electronic device 101 coupled with the processor 120, and may per-form various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the commu-nication module 190) among the components of the elec-tronic device 101, instead of the main processor 121 while the main processor 121 is in an inactive (e.g., sleep) state, or together with the main processor 121 while the main pro-cessor 121 is in an active state (e.g., executing an applica-tion). According to an embodiment, the auxiliary processor 123 (e.g., an image signal processor or a communication processor) may be implemented as part of another compo-nent (e.g., the camera module 180 or the communication module 190) functionally related to the auxiliary processor 123. According to an embodiment, the auxiliary processor 123 (e.g., the neural processing unit) may include a hard-ware structure specified for artificial intelligence model processing. An artificial intelligence model may be gener-ated by machine learning. Such learning may be performed, e.g., by the electronic device 101 where the artificial intel-ligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
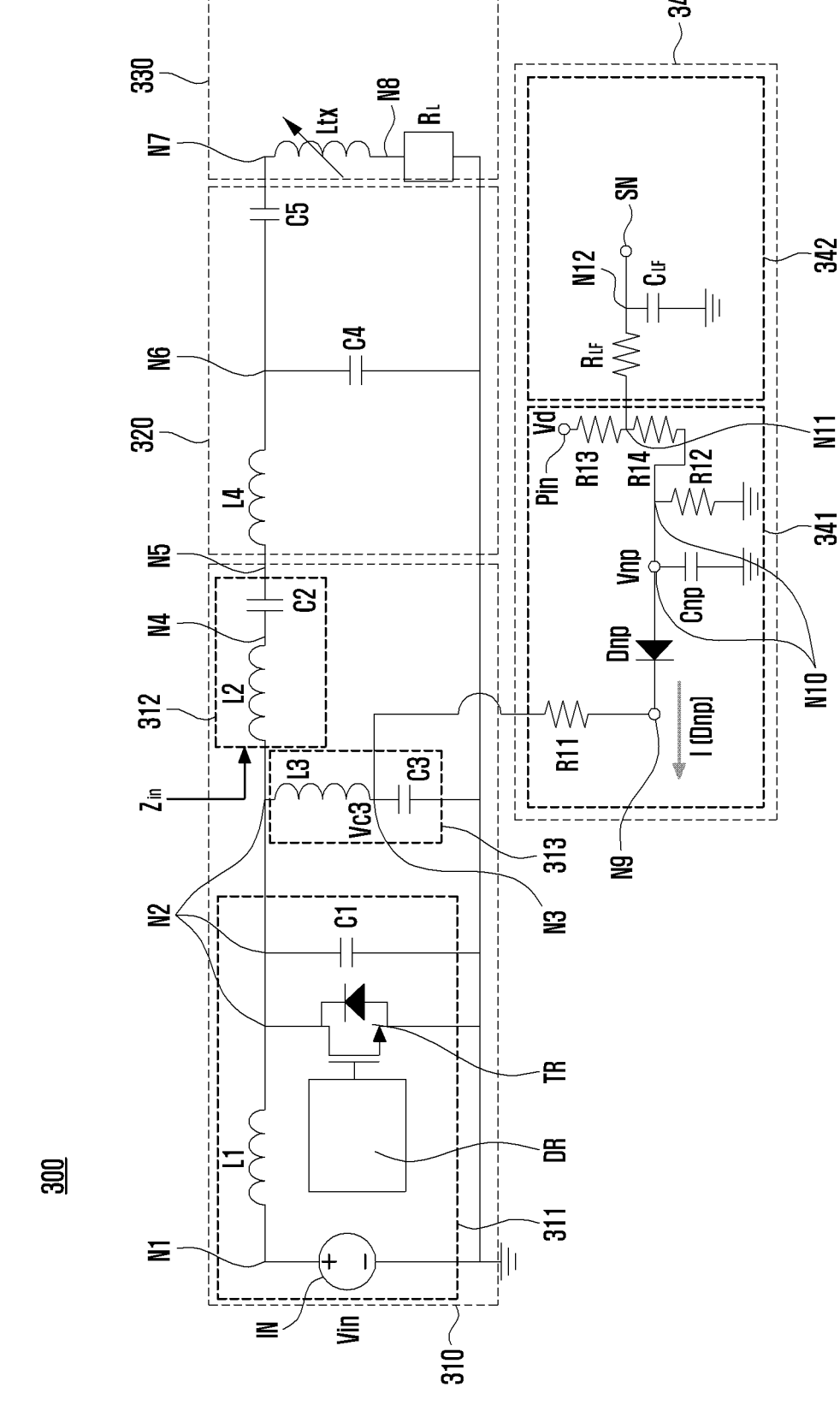
FIG. 2 is a diagram illustrating a circuit configuration of a wireless power transmission device including a negative voltage detection circuit, according to an embodiment of the disclosure.

FIG. 2 is a diagram illustrating a circuit configuration of a wireless power transmission device including a negative voltage detection circuit, according to an embodiment of the disclosure.

Referring to FIGS. 1 and 2, in various embodiments, an electronic device 101 may include a processor 120, a battery 189, and/or a wireless power transmission unit, and the wireless power transmission unit may refer to a wireless power transmission device 300 including a negative voltage detection circuit 340. The processor 120 may control the wireless power transmission device 300. The battery 189 may transmit DC power to the wireless power transmission device 300. The wireless power transmission device 300 may convert the received DC power into AC and transmit power to the outside through a magnetic resonance method.

In various embodiments, the electronic device 101 may receive DC power from a DC adapter (not illustrated) located outside the electronic device 101. The DC adapter (not illustrated) may be a device that converts AC power of 110[V] or 220[V] into DC power. The wireless power transmission device 300 included in the electronic device 101 may convert DC power received from the DC adapter (not illustrated) into AC and transmit power to the outside through a magnetic resonance method.

Referring to FIG. 2, a wireless power transmission device 300 may include a power amplifier circuit 310, a matching circuit 320, a power transmission circuit 330, and/or the negative voltage detection circuit 340.

In various embodiments, the power amplifier circuit 310 may include a switch circuit 311, a series resonant circuit 312, and/or a filter circuit 313.

In various embodiments, the power amplifier circuit 310 may be a class EF2 power amplifier. The class EF2 power amplifier may convert DC power into AC, and may enable zero-voltage switching (ZVS) by including an N-channel metal oxide semiconductor field effect transistor (MOSFET) and a capacitor connected in parallel with the N-channel MOSFET. The class EF2 power amplifier may be a class E power amplifier that further includes the filter circuit 313.

In various embodiments, the switch circuit 311 may include an input power source IN, a driver DR, a transistor TR, a first coil L1, and/or a first capacitor C1.

In various embodiments, the switch circuit 311 may be a circuit for converting DC power into AC.

In various embodiments, the input power source IN may be located between and connected to a first node N1 and ground. The input power source IN may supply DC power to the wireless power transmission device 300.

In various embodiments, the input power source IN may be a battery 189 that supplies power to at least one component of the electronic device 101.

In various embodiments, the transistor TR may be located between and connected to the second node N2 and ground. The transistor TR may be an N-channel metal oxide semiconductor field effect transistor (MOSFET).

In various embodiments, the driver DR may be connected to the transistor TR. The driver DR may generate a signal to drive the transistor TR of the switch circuit 311. For example, the transistor TR may perform turn on and/or turn off operations based on a signal from the driver DR.

Soft switching technique may be used as a method for reducing stress and power loss of a switch using a resonance method. The soft switching technique may include a zero-current switching (ZCS) method and a zero-voltage switching (ZVS) method. The soft switching technique may reduce stress and power loss of the switch by connecting an inductor and a capacitor in series or parallel with the switch and using the LC resonant frequency of the circuit to make current or voltage "O" during the switch's ON/OFF transition period.

The zero-voltage switching (ZVS) method may require a minimal load so that the capacitor connected in parallel with the switch reaches zero voltage. If the capacitor does not meet the condition of reaching zero voltage, damage to the switch may occur because the capacitor is connected in parallel with the switch.

In various embodiments, the power amplifier circuit 310 may reduce the stress and power loss of the transistor TR by implementing zero-voltage switching to reduce the area where voltage and current overlap during the ON/OFF transition period of the transistor TR.

In various embodiments, the transistor TR of the switch circuit 311 may be a switch for implementing soft switching using the zero-voltage switching (ZVS) method.

In various embodiments, the first coil L1 may be located between and connected to the first node N1 and the second node N2. The first coil L1 may serve to block an alternating current signal that may flow to the input power source IN, which is a DC power source.

In various embodiments, the first capacitor C1 may be located between and connected to the second node N2 and ground. The first capacitor C1 may allow the power amplifier circuit 310 to operate in the zero-voltage switching mode. The voltage of the first capacitor C1 may become "0[V]" during the zero-voltage switching operation.

In various embodiments, the series resonant circuit 312 may be located between and connected to the second node N2 and the matching circuit 320. The series resonant circuit 312 may include a second coil L2 and a second capacitor C2.

In various embodiments, the second coil L2 may be located between and connected to the second node N2 and a fourth node N4. The second capacitor C2 may be located between and connected to the fourth node N4 and a fifth node N5.

In various embodiments, the second coil L2 and the second capacitor C2 included in the series resonant circuit 312 may have a resonant frequency that is predetermined by the values of the second coil L2 and the second capacitor C2. The current flowing through the series resonant circuit 312 at a predetermined resonant frequency may be maximum.

In various embodiments, the filter circuit 313 may be located between and connected to the second node N2 and ground. The filter circuit 313 may include a third coil L3 and a third capacitor C3.

In various embodiments, the third coil L3 may be located between and connected to the second node N2 and a third node N3. The third capacitor C3 may be located between and connected to the third node N3 and ground.

In various embodiments, the filter circuit 313 may serve to smoothen the voltage waveform over time so that the highest voltage of the first capacitor C1 is lower than that of other power amplifiers (e.g., class E and class F power amplifiers). In a power amplifier (e.g., class E and class F power amplifiers) that does not include the filter circuit 313, a voltage change of the first capacitor C1 due to the turn-on of the switch (e.g., the transistor TR) may occur rapidly compared to a power amplifier (e.g., a class EF2 power amplifier) including the filter circuit 313. For example, in a power amplifier that does not include the filter circuit 313, the voltage change of the first capacitor C1 over time may occur in a direction perpendicular to or adjacent to the vertical on the time axis, but in the power amplifier that includes the filter circuit 313, the voltage change of the first capacitor C1 over time may be gradual rather than perpendicular to the time axis.

In the power amplifier that includes the filter circuit 313, the maximum value of the voltage of the first capacitor C1 may be smaller than that of the power amplifier that does not include the filter circuit 313.

In various embodiments, the power amplifier circuit 310 may include the filter circuit 313 so that the voltage change over time of the first capacitor C1 according to the turn on of the transistor TR is relatively gradual.

In various embodiments, the matching circuit 320 may be located between and connected to the fifth node N5 and the power transmission circuit 330. The matching circuit 320 may include a fourth coil L4, a fourth capacitor C4, and/or a fifth capacitor C5.

In various embodiments, the fourth coil L4 may be located between and connected to the fifth node N5 and a sixth node N6. The fourth capacitor C4 may be located between and connected to the sixth node N6 and ground. The fifth capacitor C5 may be located between and connected to the sixth node N6 and a seventh node N7.

In various embodiments, the input impedance Zin of the wireless power transmission device 300 may refer to an impedance in the direction facing the matching circuit 320 from the power amplifier circuit 310. For example, the input impedance Zin may refer to an impedance in the direction facing the second coil L2 from the second node N2.

In various embodiments, the matching circuit 320 may be located between and connected to the power amplifier circuit 310 and the power transmission circuit 330 to match the impedance of the power amplifier circuit 310 and the power transmission circuit 330. For example, the matching circuit 320 may be located at a front end (e.g., one end of the power transmission circuit 330 located in the direction facing the power amplifier circuit 310 from the power transmission circuit 330) of the power transmission circuit 330, and match the input impedance Zin (e.g., the impedance in the direction facing the matching circuit 320 from the power amplifier circuit 310) of the wireless power transmission device 300 with the impedance of the power transmission circuit 330.

In various embodiments, the matching circuit 320 may reverse the input impedance Zin value of the wireless power transmission device 300. For example, the "impedance" value in the direction facing the matching circuit 320 from the power amplifier circuit 310 may be converted to a "1/impedance" value through the matching circuit 320.

In various embodiments, the matching circuit 320 may operate as a gyrator to change the voltage source characteristics of the power amplifier circuit 310 to a current source.

In various embodiments, the power transmission circuit 330 may be located between and connected to the seventh node N7 and ground. The power transmission circuit 330 may include a power transmission coil Ltx and a coil resistance RL.

In various embodiments, the DC power generated from the input power source IN may be converted to AC in the power amplifier circuit 310 and transmitted to the power transmission coil Ltx of the power transmission circuit 330 through the matching circuit 320.

In various embodiments, the power transmitted to the power transmission coil Ltx may be transmitted to an externally located wireless power reception device (not illustrated) having the same resonant frequency through a magnetic resonance method.

In various embodiments, the coil resistance RL may refer to the parasitic resistance of the power transmission coil Ltx. The parasitic resistance may limit the power transmission efficiency of the wireless power transmission device 300.

In various embodiments, the power transmission coil Ltx may be located between and connected to the seventh node N7 and an eighth node N8. The power transmission coil Ltx may be a variable inductance whose inductance value may be changed.

In various embodiments, the coil resistance RL may be located between and connected to the eighth node N8 and ground.

In an embodiment, the negative voltage detection circuit 340 may be connected to the third node N3. When the voltage VC3 of the third capacitor C3 has a negative peak value, the negative voltage detection circuit 340 may store the peak value and convert the value into a positive voltage so that a voltage sensor SN may detect the value.

In an embodiment, the negative voltage detection circuit 340 may include a voltage dividing circuit 341 and a low-pass filter circuit 342.

In an embodiment, the voltage dividing circuit 341 may be located between and connected to the third node N3 and the low-pass filter circuit 342.

In an embodiment, the voltage dividing circuit 341 may include a first resistor R11, a diode Dnp, a detection circuit capacitor Cnp, a second resistor R12, a third resistor R13, a fourth resistor R14, and/or a positive voltage power supply Pin. The voltage dividing circuit 341 may store a negative voltage value when the voltage VC3 of the third capacitor C3 has a negative peak value, and receive a positive voltage Vd generated from the positive voltage power supply Pin and convert the negative voltage into the positive voltage.

In an embodiment, the first resistor R11 may be located between and connected to the third node N3 and a ninth node N9. The second resistor R12 may be located between and connected to a tenth node N10 and ground.

In an embodiment, the third resistor R13 may be located between and connected to the positive voltage power supply Pin and an eleventh node N11. The fourth resistor R14 may be located between and connected to the tenth node N10 and the eleventh node N11.

In an embodiment, the first resistor R11 may make the absolute value of detection voltage Vnp (e.g., the voltage of the tenth node N10) smaller than the voltage VC3 of the third capacitor C3. For example, the detection voltage Vnp may be a value obtained by multiplying the lowest value of the voltage VC3 of the third capacitor C3 by a first division ratio. The first division ratio may be a ratio obtained by dividing the value of the first resistor R11 by the sum of the first resistor R11 and the equivalent resistance values of the circuit connected to one end (e.g., one end located in the direction facing the diode Dnp from the first resistor R11) of the first resistor R11.

In an embodiment, the voltage dividing circuit 341 may include the first resistor R11 located between and connected to the third node N3 and the diode Dnp. Since the voltage dividing circuit 341 includes the first resistor R11, a smaller current may flow through the diode Dnp compared to the case where the first resistor R11 is not included.

In an embodiment, the voltage of the eleventh node N11 may have a value obtained by converting the negative value of the voltage VC3 of the third capacitor C3 to a positive value. The voltage value of the eleventh node N11 may be determined by the detection voltage Vnp value and the positive voltage Vd value supplied from the positive voltage power supply Pin. For example, the voltage value of the eleventh node N11 may be a value obtained by multiplying the positive voltage Vd by the second division ratio plus the value obtained by multiplying the detection voltage Vnp by the third division ratio.

In an embodiment, the second division ratio may be a ratio determined by the second resistor R12, the third resistor R13, and the fourth resistor R14. For example, the second division ratio may be the sum of the second resistor R12 and the fourth resistor R14 divided by the sum of the second resistor R12, the third resistor R13, and/or the fourth resistor R14.

In an embodiment, the third division ratio may be a ratio determined by the second resistor R12, the third resistor R13, and the fourth resistor R14. For example, the third division ratio may be the value of the third resistor R13 divided by the sum of the second resistor R12, the third resistor R13, and/or the fourth resistor R14.

In an embodiment, the diode Dnp of the voltage dividing circuit 341 may be located between and connected to the ninth node N9 and the tenth node N10. The negative electrode of the diode Dnp may be connected to the ninth node N9, and the positive electrode of the diode Dnp may be connected to the tenth node N10.

In an embodiment, the low-pass filter circuit 342 may be connected to the eleventh node N11. The low-pass filter circuit 342 may include a filter resistor RLF, a filter capacitor CLF, and a voltage sensor SN.

In an embodiment, the filter resistor RLF and the filter capacitor CLF may serve as a low-pass filter (LPF) that filters out high-frequency signals and passes low-frequency signals. Since the high-frequency signal is filtered through the low-pass filter, a signal in a form suitable for observation by the voltage sensor SN may be transmitted to the voltage sensor SN.

In an embodiment, the filter resistor RLF may be located between and connected to the eleventh node N11 and a twelfth node N12. The filter capacitor CLF may be located between and connected to the twelfth node N12 and ground.

In an embodiment, the voltage sensor SN may be connected to the twelfth node N12. The voltage sensor SN may detect the sensor output voltage VS having a positive value. The sensor output voltage VS may refer to the value at which the voltage VC3 of the third capacitor C3 is converted to a value that the voltage sensor SN may easily observe through the negative voltage detection circuit 340.

In an embodiment, a situation in which the input impedance Zin of the wireless power transmission device 300 becomes capacitive through a change in the sensor output voltage VS and zero-voltage switching cannot be implemented may be detected.

In an embodiment, the sensor output voltage VS may have an initial value determined by the positive voltage Vd supplied by the positive voltage power supply Pin and the second division ratio. When the input impedance Zin becomes capacitive and zero-voltage switching cannot be implemented, the sensor output voltage VS may decrease from the initial value to a value below a predetermined reference.

In an embodiment, when the sensor output voltage VS of the voltage sensor SN decreases below a predetermined reference, the voltage sensor SN may, under the control of the processor 120, output an alarm indicating that zero-voltage switching is not implemented in the power amplifier circuit 310.

Figure 3:
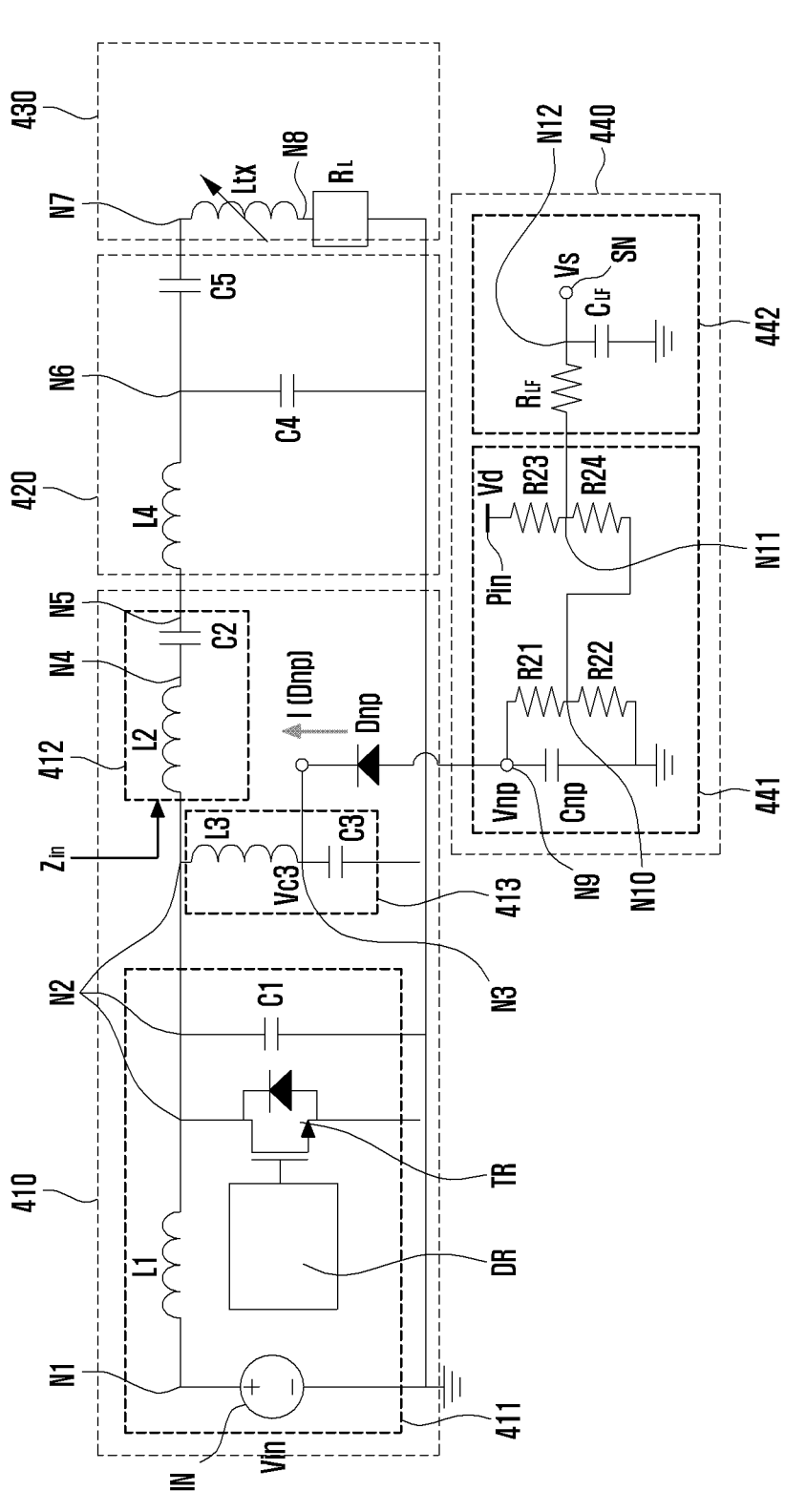
FIG. 3 is a diagram illustrating a circuit configuration of a wireless power transmission device including a negative voltage detection circuit, according to an embodiment of the disclosure.

FIG. 3 is a diagram illustrating a circuit configuration of a wireless power transmission device including a negative voltage detection circuit, according to an embodiment of the disclosure.

Referring to FIGS. 1 and 3, in various embodiments, an electronic device 101 may include a processor 120, a battery 189, and/or a wireless power transmission unit, and the wireless power transmission unit may refer to a wireless power transmission device 400 including a negative voltage detection circuit 440. The processor 120 may control the wireless power transmission device 300. The battery 189 may transmit DC power to the wireless power transmission device 400. The wireless power transmission device 400 may convert the received DC power into AC and transmit power to the outside through a magnetic resonance method.

In various embodiments, the electronic device 101 may receive DC power from a DC adapter (not illustrated) located outside the electronic device 101. The DC adapter (not illustrated) may be a device that converts AC power of 110[V] or 220[V] into DC power. The wireless power transmission device 400 included in the electronic device 101 may convert DC power received from the DC adapter (not illustrated) into AC and transmit power to the outside through a magnetic resonance method.

Referring to FIG. 3, the wireless power transmission device 400 may include a power amplifier circuit 410, a matching circuit 420, a power transmission circuit 430, and/or the negative voltage detection circuit 440.

In various embodiments, the connection relationship and function of each of the power amplifier circuit 410, matching circuit 420, and power transmission circuit 430 of the wireless power transmission device 400 illustrated in FIG. 3 may be the same as the connection relationship and function of each of the power amplifier circuit 310, the matching circuit 320, and the power transmission circuit 330 of the wireless power transmission device 300 illustrated in FIG. 2. For example, the matching circuit 420 may be located between and connected to the power amplifier circuit 410 and the power transmission circuit 430.

In various embodiments, the power amplifier circuit 410 may be a class EF2 power amplifier that converts DC power into AC. The matching circuit 420 may be located between and connected to the power amplifier circuit 410 and the power transmission circuit 430 to match the impedance of the power amplifier circuit 410 and the power transmission circuit 430. The power transmission circuit 430 may transmit power received from the input power IN to an externally located wireless power reception device (not illustrated) through a magnetic resonance method.

In various embodiments, the power amplifier circuit 410 may include a switch circuit 411, a series resonant circuit 412, and/or a filter circuit 413. The switch circuit 411 may include an input power IN, a driver DR, a transistor TR, a first coil L1, and/or a first capacitor C1. The series resonant circuit 412 may include a second coil L2 and a second capacitor C2. The filter circuit 413 may include a third coil L3 and a third capacitor C3.

In various embodiments, the input power IN may be located between and connected to a first node N1 and ground. The first coil L1 may be located between and connected to the first node N1 and a second node N2. The first capacitor C1 may be located between and connected to the second node N2 and ground. The transistor TR may be located between and connected to the second node N2 and ground. The driver DR may be connected to the transistor TR.

In various embodiments, the matching circuit 420 may be located between and connected to a fifth node N5 and a seventh node N7. The matching circuit 420 may include a fourth coil L4, a fourth capacitor C4, and/or a fifth capacitor C5.

In various embodiments, the fourth coil L4 may be located between and connected to the fifth node N5 and a sixth node N6. The fourth capacitor C4 may be located between and connected to the sixth node N6 and ground. The fifth capacitor C5 may be located between and connected to the sixth node N6 and the seventh node N7.

In various embodiments, the power transmission circuit 430 may be located between and connected to the seventh node N7 and ground. The power transmission circuit 430 may include a power transmission coil Ltx and a coil resistance RL.

In various embodiments, the power transmission coil Ltx may be located between and connected to the seventh node N7 and an eighth node N8. The coil resistance RL may be located between and connected to the eighth node N8 and ground.

The negative voltage detection circuit 440 according to another embodiment of the disclosure may be connected to the third node N3. When the voltage VC3 of the third capacitor C3 has a negative peak value, the negative voltage detection circuit 440 may store the peak value and convert the value into a positive voltage so that a voltage sensor SN may detect the value.

In an embodiment, the negative voltage detection circuit 440 may include a voltage dividing circuit 441 and a low-pass filter circuit 442.

In an embodiment, the voltage dividing circuit 441 may be located between and connected to the third node N3 and the low-pass filter circuit 442.

In an embodiment, the voltage dividing circuit 441 may include a diode Dnp, a detection circuit capacitor Cnp, a first resistor R21, a second resistor R22, a third resistor R23, a fourth resistor R24, and/or a positive voltage power supply Pin.

In an embodiment, the voltage dividing circuit 441 may store a negative voltage value when the voltage VC3 of the third capacitor C3 has a negative peak value, and receive a positive voltage Vd generated from the positive voltage power supply Pin and convert the negative voltage into the positive voltage.

In an embodiment, the first resistor R21 may be located between and connected to the ninth node N9 and the tenth node N10. The second resistor R22 may be located between and connected to the tenth node N10 and ground.

In an embodiment, the third resistor R23 may be located between and connected to the positive voltage power supply Pin and the eleventh node N11. The fourth resistor R24 may be located between and connected to the tenth node N10 and the eleventh node N11.

In an embodiment, the value of the detection voltage Vnp (e.g., the voltage of the ninth node N9) may have the same value as the lowest value of the voltage VC3 of the third capacitor C3. Since the voltage dividing circuit 341 of FIG. 2 includes the first resistor R11 between the third node N3 and the ninth node N9 but the voltage dividing circuit 441 of FIG. 3 does not include a separate resistor between the third node N3 and the ninth node N9, the detection voltage Vnp may have the same value as the lowest value of the voltage VC3 of the third capacitor C3.

In an embodiment, the voltage of the eleventh node N11 may have a value obtained by converting the minimum value of the voltage VC3 of the third capacitor C3 to a positive value. The voltage value of the eleventh node N11 may be determined by the detection voltage Vnp value and the positive voltage Vd value supplied from the positive voltage power supply Pin. For example, the voltage value of the eleventh node N11 may be a value obtained by multiplying the positive voltage Vd by the fourth division ratio plus the value obtained by multiplying the detection voltage Vnp by the fifth division ratio.

In an embodiment, the fourth division ratio may be a ratio determined by the second resistor R22, the third resistor R23, and the fourth resistor R24 of the voltage dividing circuit 441. For example, the fourth division ratio may be the sum of the second resistor R22 and the fourth resistor R24 divided by the sum of the second resistor R22, the third resistor R23, and/or the fourth resistor R24.

In an embodiment, the fifth division ratio may be a value obtained by multiplying the sixth division ratio and the seventh division ratio. The sixth division ratio may be a value obtained by dividing the value of the second resistor R22 by the sum of the first resistor R21 and the second resistor R22. The seventh division ratio may be a value obtained by dividing the value of the third resistor R23 by the sum of the second resistor R22, the third resistor R23, and/or the fourth resistor R24.

In an embodiment, the diode Dnp of the voltage dividing circuit 441 may be located between and connected to the third node N3 and the ninth node N9. The negative electrode of the diode Dnp may be connected to the third node N3, and the positive electrode of the diode Dnp may be connected to the ninth node N9.

In an embodiment, the low-pass filter circuit 442 may be connected to the eleventh node N11. The low-pass filter circuit 442 may include a filter resistor RLF, a filter capacitor CLF, and a voltage sensor SN.

In an embodiment, the filter resistor RLF and the filter capacitor CLF may serve as a low-pass filter (LPF) that filters out high-frequency signals and passes low-frequency signals. Since the high-frequency signal is filtered through the low-pass filter, a signal in a form suitable for observation by the voltage sensor SN may be transmitted to the voltage sensor SN.

In an embodiment, the filter resistor RLF may be located between and connected to the eleventh node N11 and a twelfth node N12. The filter capacitor CLF may be located between and connected to the twelfth node N12 and ground.

In an embodiment, the voltage sensor SN may be connected to the twelfth node N12. The voltage sensor SN may detect the sensor output voltage VS having a positive value. The sensor output voltage VS may refer to the value at which the voltage VC3 of the third capacitor C3 is converted to a value that the voltage sensor SN may easily observe through the negative voltage detection circuit 440.

In an embodiment, a situation in which the input impedance Zin of the wireless power transmission device 400 becomes capacitive through a change in the sensor output voltage VS and zero-voltage switching cannot be implemented may be detected.

In an embodiment, the sensor output voltage VS may have an initial value determined by the positive voltage Vd supplied by the positive voltage power supply Pin and the fourth division ratio. When the input impedance Zin becomes capacitive and zero-voltage switching cannot be implemented, the sensor output voltage VS may decrease from the initial value to a value below a predetermined reference.

In an embodiment, when the sensor output voltage VS of the voltage sensor SN decreases below a predetermined reference, the voltage sensor SN may, under the control of the processor 120, output an alarm indicating that zero-voltage switching is not implemented in the power amplifier circuit 410.

Figure 4:
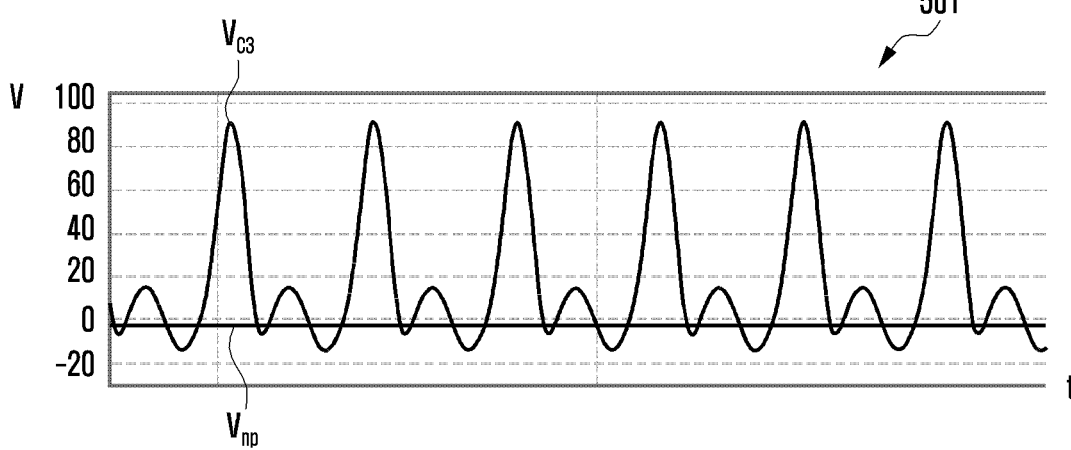
FIG. 4 is a graph illustrating changes in a voltage of a third capacitor and a current of a diode in a wireless power transmission device, according to an embodiment of the disclosure.
Figure 4:
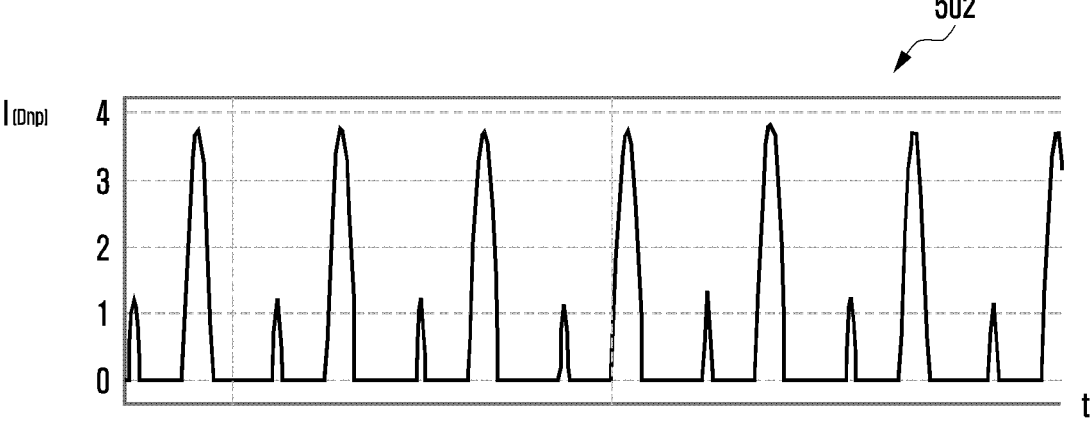

FIG. 4 is a graph illustrating changes in a voltage of a third capacitor and the current of a diode in a wireless power transmission device, according to an embodiment of the disclosure.

Graph 501 illustrates a change in the voltage VC3 of the third capacitor C3 in the wireless power transmission device 300 illustrated in FIG. 2.

In graph 501, the horizontal axis may represent time, and the vertical axis may represent the voltage VC3 or detection voltage Vnp of the third capacitor C3. The unit of voltage on the vertical axis may be [V].

Referring to FIG. 4, in graph 501, a voltage VC3 of a third capacitor C3 may be changed according to a change in an input impedance Zin of a wireless power transmission device 300 (e.g., the impedance in the direction facing the second coil L2 from the second node N2 of the wireless power transmission device 300). For example, when a magnetic material (e.g., ferrite) approaches the power transmission circuit 330 of the wireless power transmission device 300, the input impedance Zin may become capacitive, and the voltage VC3 of the third capacitor C3 may have a negative value.

Referring to graph 501 of FIG. 4, the absolute value of the detection voltage Vnp may be smaller than the largest absolute value of the negative value of the voltage VC3 of the third capacitor C3. Since the wireless power transmission device 300 illustrated in FIG. 2 includes the first resistor R11 located between and connected to the third node N3 and the ninth node N9, the absolute value of the detection voltage Vnp may be smaller than the largest absolute value of the negative value of the voltage VC3 of the third capacitor C3 due to the influence of the first resistor R11.

The detection voltage Vnp illustrated in graph 501 may have a value reduced by multiplying the lowest value of the voltage VC3 of the third node N3 by the first division ratio. The first division ratio may be a ratio obtained by dividing the value of the first resistor R11 by the sum of the first resistor R11 and the equivalent resistance values of the circuit connected to one end (e.g., one end located in a direction facing the diode Dnp from the first resistor R11 of the negative voltage detection circuit 340) of the first resistor R11.

Graph 502 illustrates a change in the current I(Dnp) flowing through the diode Dnp according to a change in the third capacitor voltage VC3 in the wireless power transmission device 300 illustrated in FIG. 2.

In graph 502, the horizontal axis may represent time, and the vertical axis may represent the amount of current I(Dnp) flowing through the diode Dnp. The unit of current I(Dnp) on the vertical axis may be [mA].

Referring to graph 502 of FIG. 4, when the voltage VC3 of the third capacitor C3 has a negative value, the amount of current I(Dnp) flowing through the diode Dnp may increase. Since the negative electrode of the diode Dnp of the negative voltage detection circuit 340 is connected to the third node N3, when the voltage VC3 of the third capacitor C3 connected to the third node N3 has a negative value, the amount of current I(Dnp) flowing through the diode Dnp may increase.

Referring to graph 502 of FIG. 4, when the voltage VC3 of the third capacitor C3 has a negative peak value, the current I(Dnp) flowing through the diode Dnp may also have a positive peak value.

Figure 5:
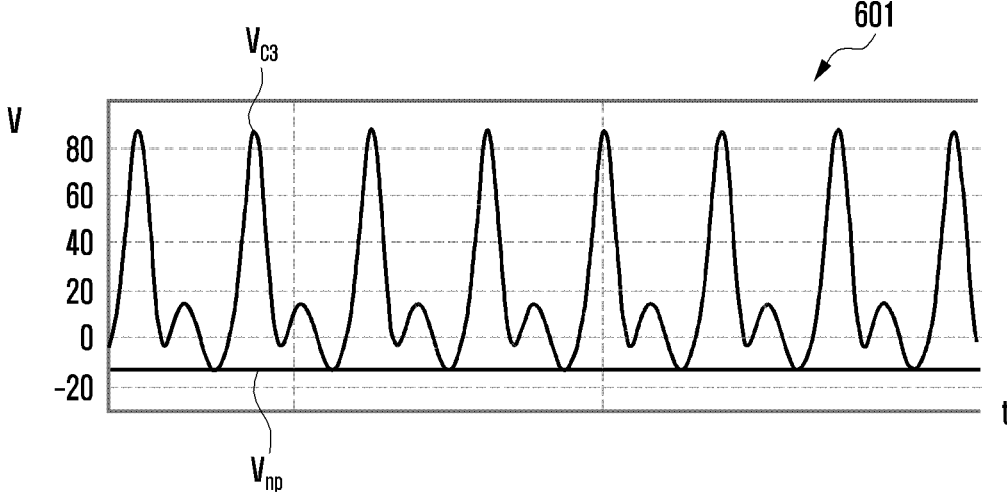
FIG. 5 is a diagram illustrating changes in a voltage of a third capacitor and a current of a diode in a wireless power transmission device, according to an embodiment of the disclosure.
Figure 5:
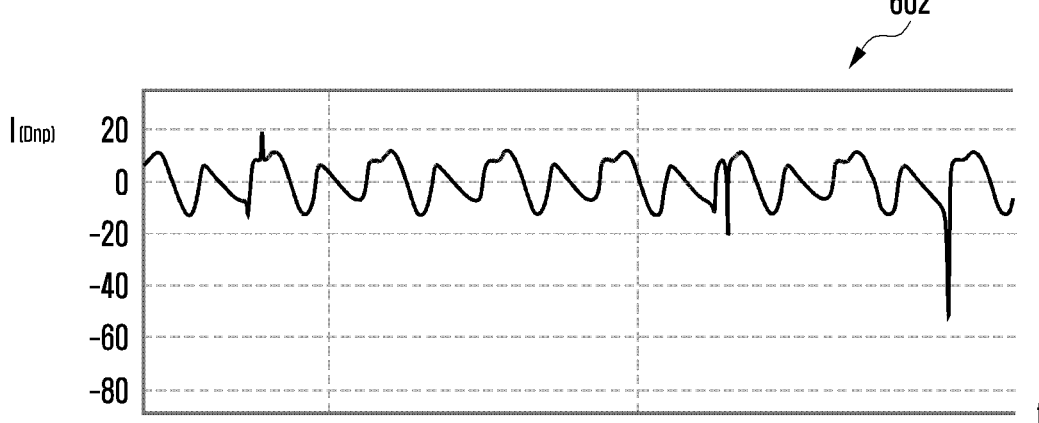

FIG. 5 is a diagram illustrating changes in voltage of a third capacitor and the current of a diode in a wireless power transmission device, according to an embodiment of the disclosure.

Graph 601 illustrates a change in the voltage VC3 of the third capacitor C3 in the wireless power transmission device 400 illustrated in FIG. 3.

In graph 601, the horizontal axis may represent time, and the vertical axis may represent the voltage VC3 or detection voltage Vnp of the third capacitor C3. The unit of voltage on the vertical axis may be [V].

Referring to FIG. 5, in graph 601, a voltage VC3 of a third capacitor C3 may be changed according to a change in an input impedance Zin of a wireless power transmission device 300 (e.g., the impedance in the direction facing the second coil L2 from the second node N2 of the wireless power transmission device 400). For example, when a magnetic material (e.g., ferrite) approaches the power transmission circuit 430 of the wireless power transmission device 400, the input impedance Zin may become capacitive, and the voltage VC3 of the third capacitor C3 may have a negative value.

Referring to graph 601 of FIG. 5, detection voltage Vnp may be formed the same as when the voltage VC3 of the third capacitor C3 has a negative peak value. Since the wireless power transmission device 400 illustrated in FIG. 3 may not include any resistor located between and connected to the third node N3 and the ninth node N9 unlike the wireless power transmission device 300 illustrated in FIG. 2, the detection voltage Vnp may be formed the same as when the voltage VC3 of the third capacitor C3 has a negative peak value.

Graph 602 illustrates a change in the current I(Dnp) flowing through the diode Dnp according to a change in the third capacitor voltage VC3 in the wireless power transmission device 400 illustrated in FIG. 3.

In graph 602, the horizontal axis may represent time, and the vertical axis may represent the amount of current I(Dnp) flowing through the diode Dnp. The unit of current on the vertical axis may be [mA].

Referring to graph 602 of FIG. 5, when the voltage VC3 of the third capacitor C3 has a negative value, the amount of current I(Dnp) flowing through the diode Dnp may increase. Since the negative electrode of the diode Dnp of the negative voltage detection circuit 440 is connected to the third node N3, when the voltage VC3 of the third capacitor C3 connected to the third node N3 has a negative value, the amount of current I(Dnp) flowing through the diode Dnp may increase.

Referring to graph 502 of FIG. 4 and graph 602 of FIG. 5, the magnitude of the current I(Dnp) flowing through the diode Dnp in the wireless power transmission device 300 of FIG. 2 may be smaller than the magnitude of the current I(Dnp) flowing through the diode Dnp in the wireless power transmission device 400 of FIG. 3. For example, in graph 502, the current I(Dnp) flowing through the diode Dnp of the wireless power transmission device 300 of FIG. 2 has a value of 4 [mA] or less, but in graph 602, the current I(Dnp) flowing through the diode Dnp of the wireless power transmission device 400 of FIG. 3 may have a value of 10 [mA] to 20 [mA]. Since the amount of current I(Dnp) flowing through the diode Dnp in the negative voltage detection circuit 340 of FIG. 2 is small, the diode Dnp may be operated relatively stably compared to the diode Dnp of the negative voltage detection circuit 440 of FIG. 3.

Since the wireless power transmission device 300 of FIG. 2 includes the first resistor R11 located between and connected to the third node N3 and the ninth node N9, the magnitude of the detection voltage Vnp of the negative voltage detection circuit 340 may be different from the value of the voltage VC3 of the third capacitor C3. Since the wireless power transmission device 400 of FIG. 3 does not include a separate resistor between the third node N3 and the ninth node N9, the magnitude of the detection voltage Vnp of the negative voltage detection circuit 440 may be the same as the minimum value of the voltage VC3 of the third capacitor C3. Accordingly, the negative voltage detection circuit 440 of FIG. 3 may more accurately detect the voltage VC3 of the third capacitor C3 than the negative voltage detection circuit 340 of FIG. 2.

Figure 6:
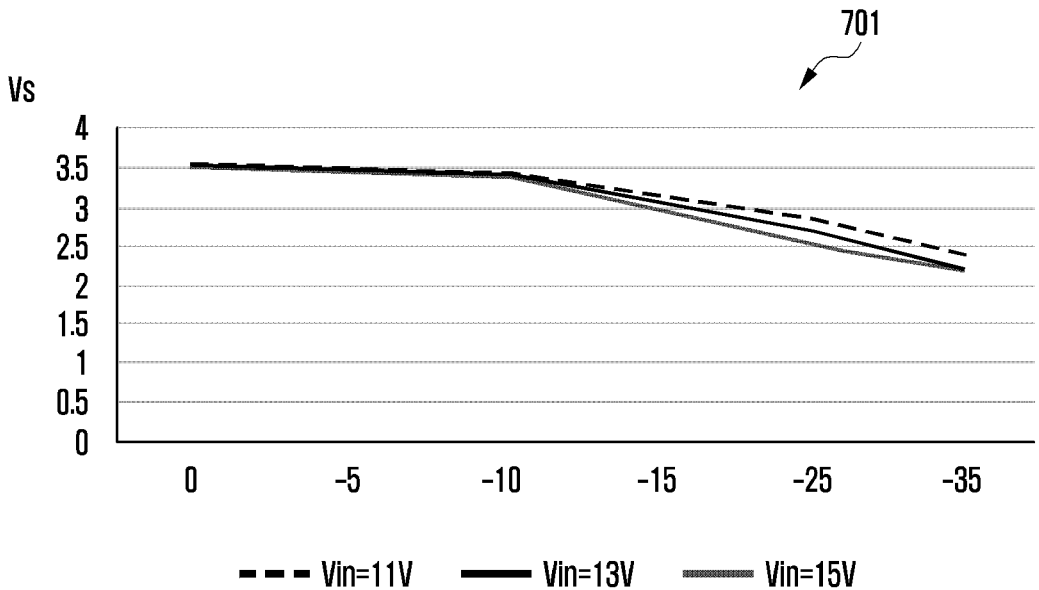
FIG. 6 is a graph illustrating a change in sensor output voltage in a situation where an input impedance of a wireless power transmission device is capacitive, according to an embodiment of the disclosure.

FIG. 6 is a graph illustrating a change in sensor output voltage in a situation where an input impedances of wireless power transmission devices are capacitive, according to an embodiment of the disclosure.

Wireless power transmission devices 300 and 400 according to various embodiments of the disclosure may include negative voltage detection circuits 340 and 440. The negative voltage detection circuits 340 and 440 may include voltage sensors SN. For example, the negative voltage detection circuits 340 and 440 may include voltage sensors SN connected to the twelfth node N12.

The voltage sensor SN according to various embodiments of the disclosure may serve to detect a change in the voltage VC3 of the third capacitor C3. The sensor output voltage VS measured by the voltage sensor SN may be a value converted by the negative voltage detection circuits 340 and 440 so that the voltage value of the voltage VC3 of the third capacitor C3 has a value within a predetermined range. For example, referring to FIG. 6, the voltage value of the voltage VC3 of the third capacitor C3 may be converted so that the sensor output voltage VS measured by the voltage sensor SN has a value of 2 [V] to 4 [V].

Referring to FIG. 6, in graph 701, the horizontal axis may represent the amount of change in the resonant frequency of the wireless power transmission devices 300 and 400, and the vertical axis may represent the sensor output voltage VS detected by the voltage sensor SN.

In graph 701 of FIG. 6, each straight line in the graph represents the sensor output voltage VS according to the voltage Vin supplied from the input power supply IN. For example, the straight line illustrated as a dotted line in graph

701 may represent a change in the sensor output voltage VS when the voltage Vin supplied from the input power supply IN is 11 [V].

In various embodiments, when a magnetic material (e.g., ferrite) approaches the power transmission circuits 330 and 430 of the wireless power transmission devices 300 and 400, the inductance of the power transmission coil Ltx may increase, and the resonant frequency is may decrease. When a metallic material approaches the power transmission circuits 330 and 430 of the wireless power transmission devices 300 and 400, the inductance of the power transmission coil Ltx may decrease and the resonant frequency may increase.

In various embodiments, the matching circuits 320 and 420 may be located between the power amplifier circuits 310 and 410 and the power transmission circuits 330 and 430. Since the matching circuits 320 and 420 may serve to reverse the input impedance Zin, when the inductances of the power transmission coil Ltx included in the power transmission circuits 330 and 430 increase, the input impedances Zin (e.g., impedance in a direction facing the matching circuits 320 and 420 from the power amplifier circuits 310 and 410 of the wireless power transmission devices 300 and 400) may be changed capacitively. When the inductance of the power transmission coil Ltx included in the power transmission circuits 330 and 430 decreases, the input impedance Zin may be changed inductively.

In various embodiments, when the input impedances Zin of the wireless power transmission devices 300 and 400 become capacitive, zero-voltage switching (ZVS) may not be implemented in the power amplifier circuits 310 and 410. When zero-voltage switching is not implemented, damage may occur to the switch (e.g., a transistor TR) and the power amplifier circuits 310 and 410 may be damaged. Accordingly, in order to prevent damage to the switch (e.g., a transistor TR) and the power amplifier circuits 310 and 410 including the switch, a situation in which the input impedances Zin of the wireless power transmission devices 300 and 400 become capacitive needs to be detected.

In various embodiments, when the input impedances Zin of the wireless power transmission devices 300 and 400 become capacitive, the voltage VC3 of the third capacitor C3 has a negative value and its absolute value may increase. For example, the absolute value of the negative voltage of the voltage VC3 of the third capacitor C3 may increase when the input impedances Zin of the wireless power transmission devices 300 and 400 are in a capacitive state rather than an inductive state.

In various embodiments, the negative voltage detection circuits 340 and 440 may convert the voltage VC3 of the third capacitor C3 from a negative value to a positive value within a predetermined range. For example, referring to graph 701, the voltage (e.g., third capacitor voltage VC3) of the filter circuit 313 is converted to a positive value, so that the sensor output voltage VS may have a value of 2 [V] to 4 [V]. In graph 701, although the sensor output voltage VS is illustrated to have a value of 2 [V] to 4 [V], but the range of the sensor output voltage VS is not limited to thereto, and the sensor output voltage VS may vary depending on the magnitude of the positive voltage Vd and the arrangement type of the resistor (e.g., the first resistor R11, the second resistor R12, the third resistor R13, and the fourth resistor R14).

In various embodiments, when the sensor output voltage VS is observed to decrease proportionally as the resonant frequency decreases from a predetermined voltage value, the input impedance Zin may be determined to be in a capacitive state. For example, referring to graph 701, when the resonant frequency decreases and the input impedance Zin becomes capacitive, the sensor output voltage VS may decrease proportionally at 3.5V as the resonant frequency decreases. When the sensor output voltage VS decreases proportionally from a predetermined voltage (e.g., 3.5V), it may be determined that the input impedances Zin of the wireless power transmission devices 300 and 400 are in a capacitive state and there is a risk that the power amplifier circuits 310 and 410 may be damaged.

Figure 7:
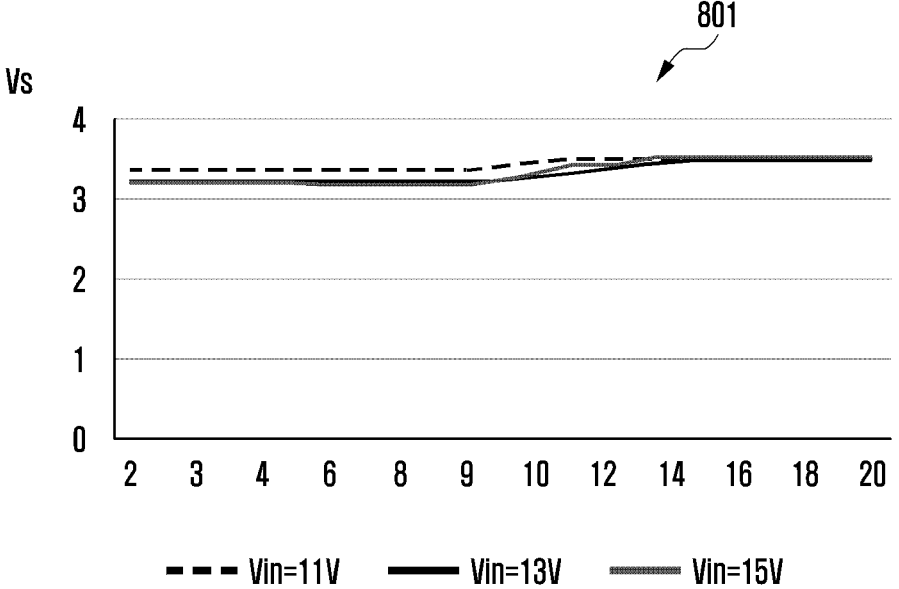
FIG. 7 is a graph illustrating a change in sensor output voltage in a situation where an input impedance of a wireless power transmission device is inductive, according to an embodiment of the disclosure.

FIG. 7 is a graph illustrating a change in sensor output voltage in a situation where an input impedances of wireless power transmission devices are inductive, according to an embodiment of the disclosure.

Referring to FIG. 7, in graph 801, the horizontal axis may represent the distance (centimeters (cm)) between wireless power transmission devices 300 and 400 and an object (e.g., a metallic material) located outside the wireless power transmission devices 300 and 400, and the vertical axis may represent the sensor output voltage VS measured by the voltage sensor SN.

In graph 801 of FIG. 7, each straight line in the graph represents the sensor output voltage VS according to the voltage Vin supplied from the input power supply IN. For example, the straight line illustrated as a dotted line in graph 701 may represent a change in the sensor output voltage VS when the voltage Vin supplied from the input power supply IN is 11 [V].

In various embodiments, when a metallic material approaches the power transmission circuits 330 and 430 of the wireless power transmission devices 300 and 400, the inductance of the power transmission coil Ltx may decrease and the resonant frequency may increase.

In various embodiments, since the matching circuits 320 and 420 may serve to reverse the input impedance Zin, when the inductances of the power transmission coil Ltx included in the power transmission circuits 330 and 430 decrease, the input impedances Zin may be changed inductively.

Graph 801 may represent a change in the sensor output voltage VS in a situation where the input impedance Zin is inductive. The horizontal axis of graph 801 may represent the distance (cm) between the metallic material and the wireless power transmission devices 300 and 400. As the distance between the metallic material and the wireless power transmission devices 300 and 400 decreases, the resonant frequency may increase. As the resonant frequency increases, the input impedance Zin may be changed inductively, and graph 801 illustrates the change in the sensor output voltage VS in a situation where the input impedance is inductively changed.

Referring to graph 801 of FIG. 7, when the input impedance Zin becomes inductive, the sensor output voltage VS may change to maintain a slightly reduced value from the predetermined initial value. For example, when the input impedance Zin becomes inductive, the sensor output voltage VS may decrease from 3.5 [V] to 3.2 [V].

In graph 801 of FIG. 7, although the initial value of the sensor output voltage VS is illustrated to have a value of 3.5 [V], but the initial value of the sensor output voltage VS is not limited to thereto, and the initial value of the sensor output voltage VS may vary depending on the magnitude of the positive voltage Vd and the arrangement type of the resistor (e.g., the first resistor R11, the second resistor R12, the third resistor R13, and the fourth resistor R14).

Comparing graph 801 of FIG. 7 with graph 701 of FIG. 6, the range of change in the sensor output voltage VS when the input impedance Zin becomes inductive may be smaller than the range of change in the sensor output voltage VS when the input impedance Zin becomes capacitive.

In various embodiments, the state of the input impedance Zin may be determined through the change amount of the sensor output voltage VS. For example, if the sensor output voltage VS does not decrease proportionally from the initial value but maintains a slightly decreased form from the initial value, it may be determined that the input impedance Zin has become inductive. Since zero-voltage switching may be implemented in a situation where the input impedance Zin is inductive, it may be determined that there is no risk of damage to the power amplifier circuits 310 and 410.

In various embodiments, an increase in the inductance of the power transmission coil Ltx included in the wireless power transmission devices 300 and 400 may be required to control the wireless power transmission devices 300 and 400. A magnetic material may be brought close to the power transmission coil Ltx to increase the inductance of the power transmission coil Ltx. The magnetic material may be ferrite, but is not limited to ferrite and may include materials with magnetic properties.

In various embodiments, a magnetic material may be approached to increase the inductance of the power transmission coil Ltx, but when the inductance increases beyond a predetermined reference, damage may occur to the wireless power transmission devices 300 and 400. The negative voltage detection circuits 340 and 440 may detect this situation and prevent damage to the wireless power transmission devices 300 and 400. For example, when a magnetic material (e.g., ferrite) approaches the power transmission coil Ltx and the inductance of the power transmission coil Ltx increases beyond the predetermined reference, the power amplifier circuits 310 and 410 of the wireless power transmission devices 300 and 400 may be damaged because zero-voltage switching (ZVS) of the wireless power transmission devices 300 and 400 is not implemented. When the inductance of the power transmission coil Ltx increases beyond the predetermined reference and the input impedance Zin becomes capacitive, since the voltage VC3 of the third capacitor C3 may have a negative peak value, the negative voltage detection circuits 340 and 440 may detect this state and determine a case in which zero-voltage switching ZVS is not implemented.

Figure 8:
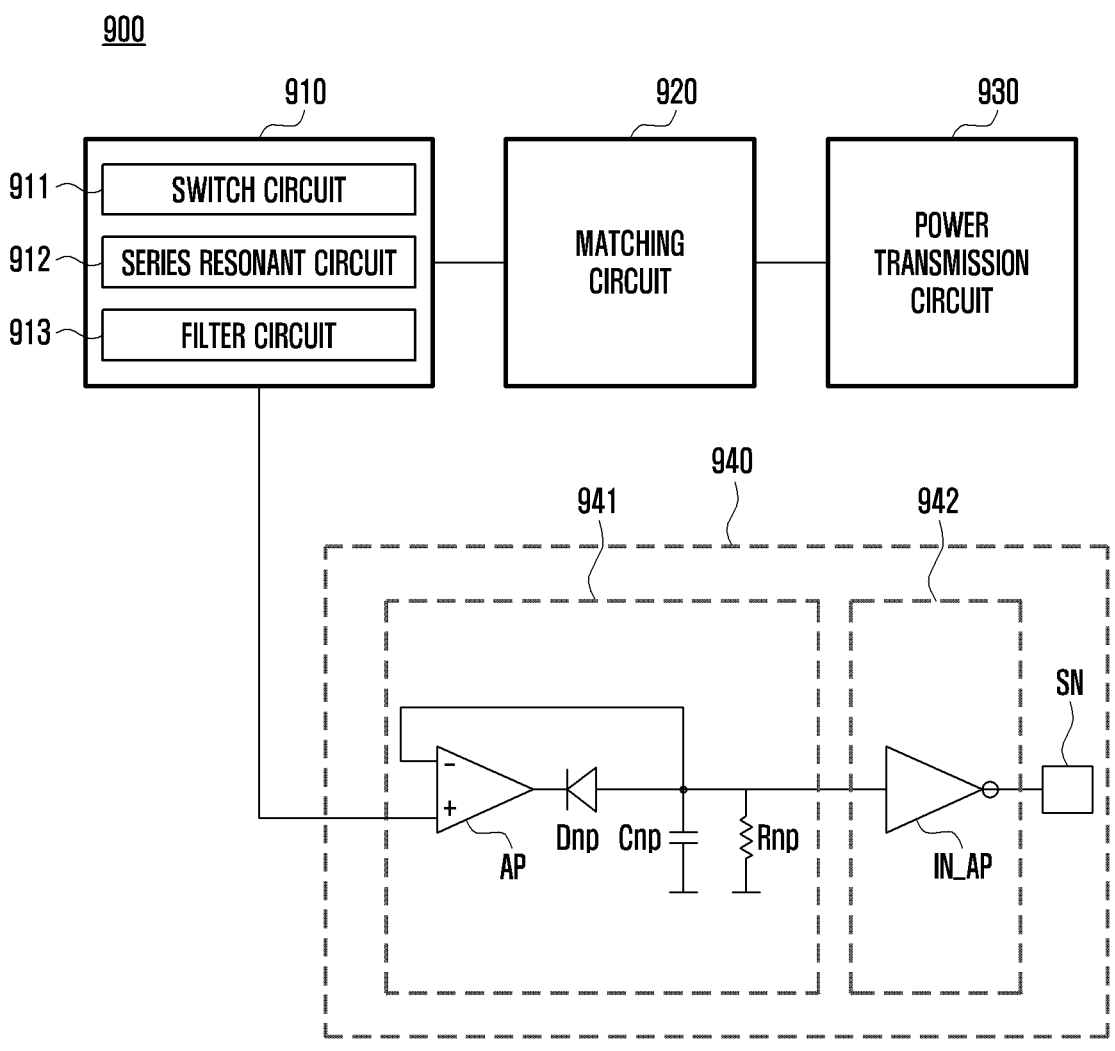
FIG. 8 is a diagram illustrating a circuit configuration of a wireless power transmission device including a negative voltage detection circuit, according to an embodiment of the disclosure.

FIG. 8 is a diagram illustrating a circuit configuration of a wireless power transmission device including a negative voltage detection circuit, according to an embodiment of the disclosure.

Referring to FIG. 8, in various embodiments, an electronic device 101 may include a processor 120, a battery 189, and/or a wireless power transmission unit. The wireless power transmission unit may refer to a wireless power transmission device 900 including a negative voltage detection circuit 940. The processor 120 may control the wireless power transmission device 900. The battery 189 may transmit DC power to the wireless power transmission device 900. The wireless power transmission device 900 may convert the received DC power into AC power and transmit the power to the outside through a magnetic resonance method.

In various embodiments, the electronic device 101 may receive DC power from a DC adapter (not illustrated) located outside the electronic device 101. The DC adapter (not illustrated) may be a device that converts AC power of 110[V] or 220[V] into DC power. The wireless power transmission device 900 included in the electronic device 101 may convert DC power received from the DC adapter (not illustrated) into AC and transmit power to the outside through a magnetic resonance method.

Referring to FIG. 8, a wireless power transmission device 900 may include a power amplifier circuit 910, a matching circuit 920, a power transmission circuit 930, and/or a negative voltage detection circuit 940.

In various embodiments, the function and configuration of the power amplifier circuit 910 may be the same as the function and configuration of the power amplifier circuit 310 of the wireless power transmission device 300 illustrated in FIG. 2. For example, the power amplifier circuit 910 may be a class EF2 power amplifier that converts DC power into AC.

In various embodiments, the power amplifier circuit 910 may include a switch circuit 911, a series resonant circuit 912, and/or a filter circuit 913. The functions and configurations of the switch circuit 911, the series resonant circuit 912, and/or the filter circuit 913 may be the same as those of the switch circuit 311, the series resonant circuit 312, and/or the filter circuit 313 of the wireless power transmission device 300 illustrated in FIG. 2.

In various embodiments, the functions and configurations of the matching circuit 920 and the power transmission circuit 930 may be the same as those of the matching circuit 320 and the power transmission circuit 330 of the wireless power transmission device 300 illustrated in FIG. 2. For example, the matching circuit 920 may be located between and connected to the power amplifier circuit 910 and the power transmission circuit 930 to match the impedance of the power amplifier circuit 910 and the power transmission circuit 930. The power transmission circuit 930 may transmit power to an externally located wireless power reception device (not illustrated) through a magnetic resonance method.

In an embodiment, the negative voltage detection circuit 940 may be connected to the filter circuit 913 of the power amplifier circuit 910. The negative voltage detection circuit 940 may store the value when the voltage of the filter circuit 913 has a negative peak value and convert the value into a positive voltage value to allow the voltage sensor SN to detect the value.

In an embodiment, the negative voltage detection circuit 940 may include a precision rectification circuit 941, an inverting amplifier circuit 942, and/or a voltage sensor SN.

In an embodiment, the precision rectification circuit 941 may serve to convert AC received from the filter circuit 913 into DC.

In an embodiment, the precision rectification circuit 941 may include a non-inverting amplifier AP, a diode Dnp, a detection circuit capacitor Cnp, and/or a detection circuit resistor Rnp. The positive electrode of the non-inverting amplifier AP may be connected to the filter circuit 913. The negative electrode of the diode Dnp may be connected to a non-inverting amplifier AP. The detection circuit capacitor Cnp may store the value when the voltage of the filter circuit 913 has a negative peak value.

In an embodiment, the inverting amplifier circuit 942 may include an inverting amplifier IN_AP. The inverting amplifier IN_AP converts negative voltage to positive voltage and may serve to amplify the positive voltage value.

In an embodiment, the voltage sensor SN may be connected to the inverting amplifier circuit 942. The voltage sensor SN may detect the positive voltage value converted and amplified in the inverting amplifier circuit 942.

In an embodiment, when the value of the voltage detected by the voltage sensor SN decreases below a predetermined reference, the voltage sensor SN may, under the control of the processor 120, output an alarm indicating that zero-voltage switching is not implemented in the power amplifier circuit 910.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that the embodiments and the terms used therein are not intended to limit the technological features set forth herein to particular embodiments and the disclosure includes various changes, equivalents, or alternatives for a corresponding embodiment. With regard to the description of the drawings, similar reference numerals may be used to designate similar or relevant elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). If an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used in various embodiments of the disclosure, the term "module" may include a unit implemented in hardware, software, or firmware, and may be interchangeably used with other terms, for example, "logic," "logic block," "component," or "circuit". The "module" may be a single integrated component, or a minimum unit or part thereof, adapted to perform one or more functions. For example, according to an embodiment, the "module" may be implemented in the form of an application-specific integrated circuit (ASIC).

Various embodiments of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions each may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., module or program) of the above-described elements may include a single entity or multiple entities, and some of the multiple entities may be separately disposed in another element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a processor;
a battery; and
a wireless power transmission device,
wherein the wireless power transmission device comprises:
a power amplifier circuit including a switch circuit, a filter circuit, and a series resonant circuit, the power amplifier circuit being configured to convert direct current (DC) power received from the battery or a DC adapter into alternating current (AC) and to implement zero-voltage switching (ZVS),
a power transmission circuit including a power transmission coil configured to transmit power received from the power amplifier circuit to outside,
a matching circuit located between and connected to the power amplifier circuit and the power transmission circuit, the matching circuit being configured to match an impedance of the power amplifier circuit and the power transmission circuit, and
a negative voltage detection circuit connected to the filter circuit of the power amplifier circuit and configured to detect a negative voltage generated in the filter circuit, and
wherein the negative voltage detection circuit comprises:
a voltage dividing circuit including a positive voltage power supply and a plurality of resistors, the voltage dividing circuit being configured to convert the negative voltage generated in the filter circuit of the power amplifier circuit into a positive voltage in a predetermined range, a voltage sensor configured to detect the positive voltage, and a low-pass filter located between and connected to the voltage dividing circuit and the voltage sensor.

2. The electronic device of claim 1, wherein the switch circuit comprises:

a first coil located between and connected to a first node and a second node, the first coil being configured to block an AC signal capable of flowing to the battery;

a transistor located between and connected to the second node and ground, the transistor being configured to be turned on or off according to an electrical signal and to serve as a switch to implement soft switching with a ZVS method;

a driver connected to the transistor and configured to generate a driver signal to drive the transistor; and a first capacitor located between and connected to the second node and ground.

3. The electronic device of claim 2, wherein the series resonant circuit comprises:

a second coil located between and connected to the second node and a fourth node; and a second capacitor located between and connected to the fourth node and a fifth node, and wherein the filter circuit comprises:

a third coil located between and connected to the second node and a third node; and a third capacitor located between and connected to the third node and ground.

4. The electronic device of claim 3, wherein the matching circuit comprises:

a fourth coil located between and connected to the fifth node and a sixth node;

a fourth capacitor located between and connected to the sixth node and ground; and a fifth capacitor located between and connected to the sixth node and a seventh node, and wherein the power transmission coil of the power transmission circuit is located between and connected to the seventh node and an eighth node.

5. The electronic device of claim 3, wherein the negative voltage detection circuit is connected to the third node, and wherein the voltage dividing circuit comprises:

a first resistor located between and connected to the third node and a ninth node; and a diode whose negative electrode is connected to face the ninth node and whose positive electrode is connected to face a tenth node.

6. The electronic device of claim 5, wherein the voltage dividing circuit further comprises:

a detection circuit capacitor located between and connected to the tenth node and ground;

a second resistor located between and connected to the tenth node and ground;

a third resistor located between and connected to the positive voltage power supply and an eleventh node; and a fourth resistor located between and connected to the tenth node and the eleventh node.

7. The electronic device of claim 6, wherein the low-pass filter comprises:

a filter resistor located between and connected to the eleventh node and a twelfth node; and a filter capacitor located between and connected to the twelfth node and ground.

8. The electronic device of claim 3, wherein the negative voltage detection circuit is connected to the third node, and wherein the voltage dividing circuit comprises a diode whose negative electrode is connected to face the third node and whose positive electrode is connected to face a ninth node.

9. The electronic device of claim 8, wherein the voltage dividing circuit further comprises:

a detection circuit capacitor located between and connected to the ninth node and ground;

a first resistor located between and connected to the ninth node and a tenth node;

a second resistor located between and connected to the tenth node and ground;

a third resistor located between and connected to the positive voltage power supply and an eleventh node; and a fourth resistor located between and connected to the tenth node and the eleventh node.

10. The electronic device of claim 9, wherein the low-pass filter comprises:

a filter resistor located between and connected to the eleventh node and a twelfth node; and a filter capacitor located between and connected to the twelfth node and ground.

11. A wireless power transmission device comprising:

a power amplifier circuit including a switch circuit, a filter circuit, and a series resonant circuit, the power amplifier circuit being configured to convert direct current (DC) power received from a battery or a DC adapter into alternating current (AC) and to implement zero-voltage switching (ZVS);

a power transmission circuit including a power transmission coil configured to transmit power received from the power amplifier circuit to outside;

a matching circuit located between and connected to the power amplifier circuit and the power transmission circuit, the matching circuit being configured to match an impedance of the power amplifier circuit and the power transmission circuit; and a negative voltage detection circuit connected to the filter circuit of the power amplifier circuit and configured to detect a negative voltage generated in the filter circuit, wherein the negative voltage detection circuit comprises:

a voltage dividing circuit including a positive voltage power supply and a plurality of resistors, the voltage dividing circuit being configured to convert the negative voltage generated in the filter circuit of the power amplifier circuit into a positive voltage in a predetermined range, a voltage sensor configured to detect the positive voltage, and a low-pass filter located between and connected to the voltage dividing circuit and the voltage sensor.

12. The wireless power transmission device of claim 11, wherein the switch circuit comprises:

an input power source located between and connected to a first node and ground, the input power source being configured to supply the DC power to the power amplifier circuit;

a first coil located between and connected to the first node and a second node, the first coil being configured to block an AC signal capable of flowing to the input power source;

a transistor located between and connected to the second node and ground, the transistor being configured to be turned on or off according to an electrical signal and to serve as a switch to implement soft switching with a ZVS method;

a driver connected to the transistor and configured to generate a driver signal to drive the transistor; and a first capacitor located between and connected to the second node and ground.

13. The wireless power transmission device of claim 12, wherein the series resonant circuit comprises:

a second coil located between and connected to the second node and a fourth node; and a second capacitor located between and connected to the fourth node and a fifth node, wherein the filter circuit comprises:

a third coil located between and connected to the second node and a third node; and a third capacitor located between and connected to the third node and ground, wherein the matching circuit comprises:

a fourth coil located between and connected to the fifth node and a sixth node;

a fourth capacitor located between and connected to the sixth node and ground; and a fifth capacitor located between and connected to the sixth node and a seventh node, and wherein the power transmission coil of the power transmission circuit is located between and connected to the seventh node and an eighth node.

14. The wireless power transmission device of claim 13, wherein the negative voltage detection circuit is connected to the third node, and wherein the voltage dividing circuit comprises:

a first resistor located between and connected to the third node and a ninth node;

a diode whose negative electrode is connected to face the ninth node and whose positive electrode is connected to face a tenth node;

a detection circuit capacitor located between and connected to the tenth node and ground;

a second resistor located between and connected to the tenth node and ground;

a third resistor located between and connected to the positive voltage power supply and an eleventh node; and a fourth resistor located between and connected to the tenth node and the eleventh node.

15. The wireless power transmission device of claim 14, wherein the low-pass filter comprises:

a filter resistor located between and connected to the eleventh node and a twelfth node; and a filter capacitor located between and connected to the twelfth node and ground.

16. The wireless power transmission device of claim 13, wherein the negative voltage detection circuit is connected to the third node, and wherein the voltage dividing circuit comprises:

a diode whose negative electrode is connected to face the third node and whose positive electrode is connected to face a ninth node;

a detection circuit capacitor located between and connected to the ninth node and ground;

a first resistor located between and connected to the ninth node and a tenth node;

a second resistor located between and connected to the tenth node and ground;

a third resistor located between and connected to the positive voltage power supply and an eleventh node; and a fourth resistor located between and connected to the tenth node and the eleventh node.

17. The wireless power transmission device of claim 16, wherein the low-pass filter comprises:

a filter resistor located between and connected to the eleventh node and a twelfth node; and a filter capacitor located between and connected to the twelfth node and ground.

* * * * *